United States Patent [19]

Foote

[11] Patent Number: 4,745,504
[45] Date of Patent: May 17, 1988

[54] DISC MEMORY HEAD POSITIONER

[75] Inventor: Wayne E. Foote, Boise, Id.

[73] Assignee: Hewlett-Packard Company, Palo Alto, Calif.

[21] Appl. No.: 28,036

[22] Filed: Mar. 19, 1987

Related U.S. Application Data

[63] Continuation-in-part of Ser. No. 590,814, Mar. 19, 1984, abandoned.

[51] Int. Cl.$^4$ .......................... G11B 5/55; G11B 21/08
[52] U.S. Cl. .................................................. 360/106
[58] Field of Search ............ 360/106, 105, 86, 97-99, 360/75, 77, 109

[56] References Cited

U.S. PATENT DOCUMENTS 4,423,446 12/1983 Takahashi et al. .................. 360/106
4,556,924 12/1985 Quist, Jr. et al. ................... 360/106

FOREIGN PATENT DOCUMENTS 0013310 1/1979 Japan ................................... 360/106

Primary Examiner—Stuart N. Hecker
Assistant Examiner—David J. Severin
Attorney, Agent, or Firm—Leslie G. Murray

[57] ABSTRACT

A friction driven head positioner system for a disk memory including a positioner arm with a flexural pivot end and a driven end on which read/write heads are mounted. The flexural pivot end is coupled to a support post of the chassis of the disk memory and a spring urges the driven end of the positioner arm into a shaft of a positioner motor to thereby drive the heads across tracks of the disk.

2 Claims, 2 Drawing Sheets

DISC MEMORY HEAD POSITIONER

CROSS REFERENCE TO RELATED APPLICATION

This application is a continuation-in-part of application Ser. No. 590,814, filed Mar. 19, 1984, now abandoned.

BACKGROUND AND SUMMARY

The present invention relates to small-diameter rigid disc memory devices, in particular the positioning of the head or heads over the desired track for reading and writing data from and onto, respectively, the rotating disc. Head positioners can be driven by stepper motors, or be controlled by a DC servo motor system, and include either a linear or rotary actuator arm.

Various drive techniques are used in stepper motor head positioners including direct drive, band actuators and ball-screw drives. Direct drive usually provides poor resolution and screw drives are expensive. A band drive requires a capstan, the diameter of which becomes very small to achieve the desired resolution over a track on a disc having small track-to-track spacing. A small diameter capstan may impose prohibitively high stresses in the band.

A disc memory head positioner constructed according to the principles of the present invention comprises an actuator arm, mounted to a support post by a flexural pivot driven by a friction drive system pre-loaded by a tension spring. The friction drive system employs a micro-stepped stepper motor. By servo-controlling the stepper motor to track center, very accurate position over the desired track is achieved. Stepper motor holding torque is then used to hold the heads rigidly in position.

The head positioner of the present invention incorporates the advantages of a rotary-actuated arm about a pivot point. The pivot point comprises a single, flat strip, flexural pivot that supports the actuator arm while providing vertical stiffness at the attachment point as well as torsional stiffness overall.

The flexural pivot support of the present invention provides lower friction and hysteresis than is possible with typical ball-bearing and shaft designs, avoids the cost of machining parts to close tolerances, and provides much longer life than prior-art designs.

The friction drive system of the present invention provides high resolution positioning as compared to rolling band or lead screw drive systems which are usually supported by ball or sleeve bearings. Friction drive resolution is not limited by band bend radius or screw interface friction which is present in the last mentioned prior-art systems. Absolute repeatability is not required in the present system because the stepper motor is servo controlled to the tracks on the disc. It should be noted that significantly fewer parts which exclude ball-bearings are necessary to construct the positioner of the present invention.

DESCRIPTION OF THE PREFERRED EMBODIMENT

Figure 1:
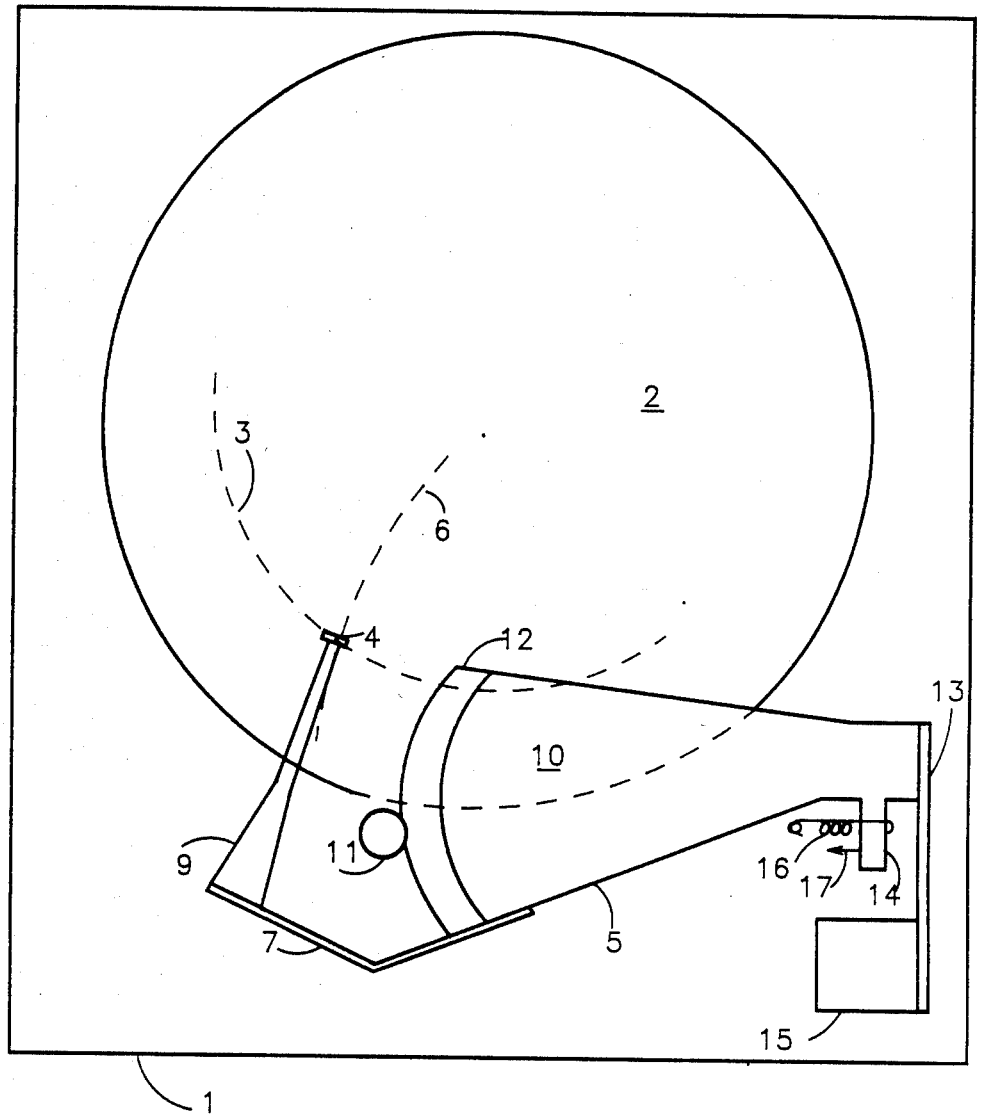
FIG. 1 is a top view of a disc memory head positioner constructed according to the principles of the present invention.

Referring now to FIG. 1, a magnetic disc drive in accordance with the principles of the present invention is shown. Head positioner 5 is mounted on the chassis 1 by support post 15. Positioner arm 10 provides support for and positions the read/write head (or heads) 4 to a desired read/write track on magnetic disc 2; e.g., the track represented by dashed arc 3. Head positioner 5 comprises positioner arm 10 having one end flexibly coupled to support post 15 by flexural pivot 13. The other end of positioner arm 10 is supported vertically by drive shaft 11. Read/write head 4 is rigidly coupled to positioner arm 10 in a conventional manner by flexure arm 9 and extension arm 7. Positioner arm 10 is frictionally coupled to drive shaft 11 by drive surface 12. In response to rotary motion of drive shaft 11, positioner arm 10 positions the read/write head 4 to any desired position on the magnetic storage disc 2 along a path approximately represented by dashed line 6. The frictional coupling between drive shaft 11 and driven surface 12 is also configured to prevent vertical motion of positioner arm 10.

Figure 2A:
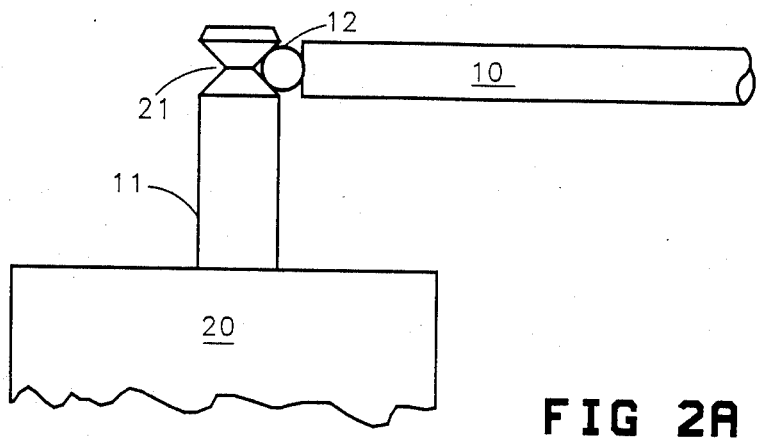
FIG. 2A is a side view of the friction drive system of the disc memory head positioner of FIG. 1.
Figure 2B:
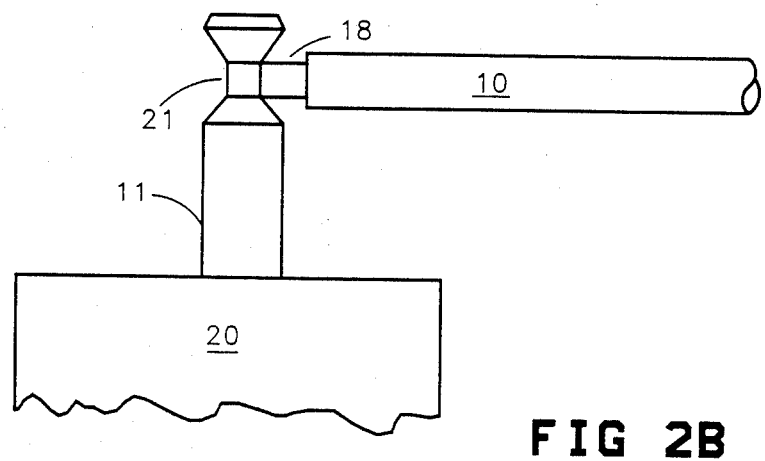
FIG. 2B is a side view of another embodiment of the friction drive system of FIG. 2A.

Referring now to FIGS. 2A and 2B, vertical motion of positioner arm 10 is substantially prevented by the engagement of V-groove 21 of drive shaft 11 with the circular profile of driven surface 12 affixed to positioner arm 10. Tapered groove 22 shown in FIG. 2B also tends to prevent vertical motion of positioner arm 10 while tending to extend the life of driven surface 18.

Figure 3:
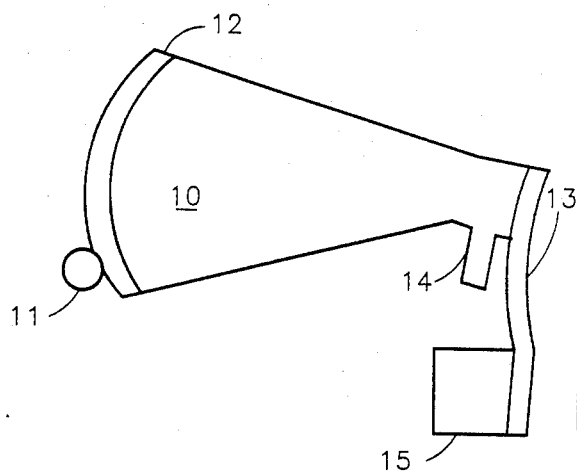
FIG. 3 is a top view of the disc memory head positioner system of FIG. 1 showing the flexural pivot deflected as the positioner arm is actuated.

Referring again to FIG. 2A, rotation of drive shaft 11 causes the arm to be driven in an arc about a center of rotation near flexural pivot 13 as shown in FIG. 3. The center of rotation is determined by the arcuate shape of driven surface 12 and the bending characteristics of flexural pivot 13.

Flexural pivot 13 is constructed of a single strip of stainless steel, which gives positioner arm 10 vertical stiffness at the attachment point as well as torsional stiffness. Torsional stiffness of flexural pivot 13 could enhance frictional engagement of driven surface 12 with V-groove 21 if drive shaft 11 with V-groove 21 is located so as to deflect flexural pivot 13 at all positions of positioner arm 10. However, such deflection may cause unnecessary stress in flexural pivot 13. Thus, it is also desirable to shape driven surface 12 to approximately conform with the natural center of rotation of flexural pivot 13 to avoid unnecessary stress during deflection of flexural pivot 13. Frictional engagement of driven surface 12 with groove 21 is assured by a preload, such as a tension spring 16, at 14 in direction 17 (as shown in FIG. 1).

Bending of flexural pivot 13 provides a torque which tends to produce a rotation of positioner arm 10 counter to the rotation produced by the drive motor 20. The tension preload at 14 assures adequate frictional engagement between driven surface 12 and V-groove 21 to achieve required positioner resolution. While the material for flexural pivot support 13 is selected for torsional stiffness characteristics, it is not so stiff as to preclude deflection as shown in FIG. 3.

Head positioner arm 10, which provides support for read/write heads 4 over a desired track in a disc memory system is constructed of aluminum or other lightweight, high-tensile modulus material extension arm 7 may be an integral part of positioner arm 10 or a separate structure bolted or riveted to positioner arm 10. Support post 15 is constructed of a zinc alloy and may be an integral part of the drive system chassis 1 casting. Driven surface 12 comprises a thermoplastic material selected for low wear properties and is attached to the end of positioner arm 10 by adhesive bonding or may be an integral part of positioner arm 10.

V-groove 21 is formed in the end of or affixed to the end of drive shaft 11 which is an integral part of drive motor 20. V-groove 21 is formed to assure adequate frictional engagement with driven surface 12 and to substantially preclude vertical movement of head positioner arm 10. The surface of V-groove 21 is knurled to enhance frictional engagement.

Drive motor 20 is mounted on the chassis 1 of the disc memory. As mentioned elsewhere in this specification, drive motor 20 is servo-controlled, but is driven open-loop until positioner arm 10 nears the track to which positioner arm 10 is moved (target track) if moving from more than approximately three tracks away. As positioner arm 10 approaches a target track, or the distance is less than approximately three tracks, stepper motor 20 is microstepped. The number of full or microsteps is calculated from data representing the number of tracks to be moved. Data representing the number of tracks is computed by a microprocessor (not shown) elsewhere in the system. Since any known drive system may be used with the head positioner of the present invention, the stepper motor control system does not form a part of the present invention.

What is claimed is:

1. Apparatus for positioning read/write heads in a disc memory system comprising:

a chassis;

support means mounted on said chassis;

a positioner arm, having a supported end and a driven end, for supporting at least one read/write head and for positioning said read/write head over a desired track on a memory disc;

flexural support means for pivotally coupling said supported end of said positioner arm to said support means;

drive means coupled to said driven end of said positioner arm for rotatably driving and providing vertical support for said positioner arm, said read/write head mounted at said driven end of said positioner arm; and spring means for urging said driven end of said positioner arm into engagement with said drive means.

2. Apparatus as in claim 1 wherein said positioner arm includes a driven surface at said driven end of said positioner arm and said drive means includes a drive shaft for engaging said driven surface, said spring means urging said driven surface into engagement with said drive shaft.

* * * * *